Sept. 9, 1924.                                              1,508,177
F. E. FRAZIER
APPARATUS FOR WASHING MILK OF MAGNESIA
Filed Jan. 8, 1921
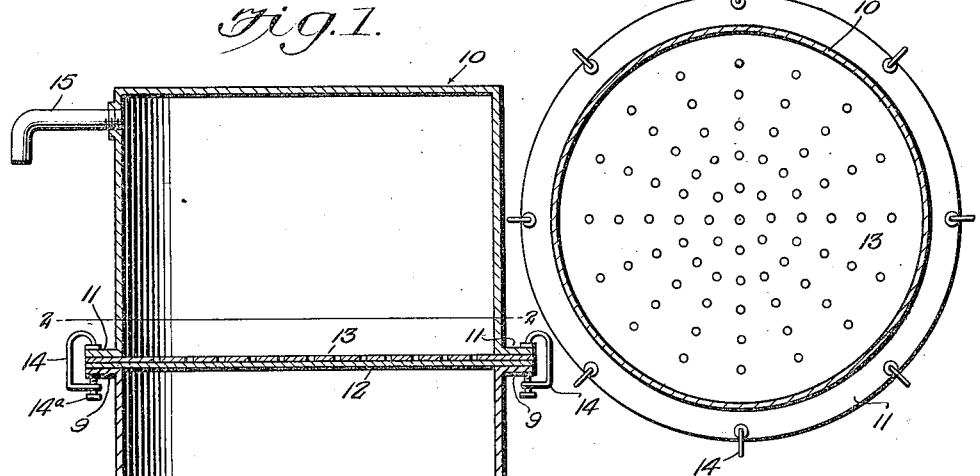
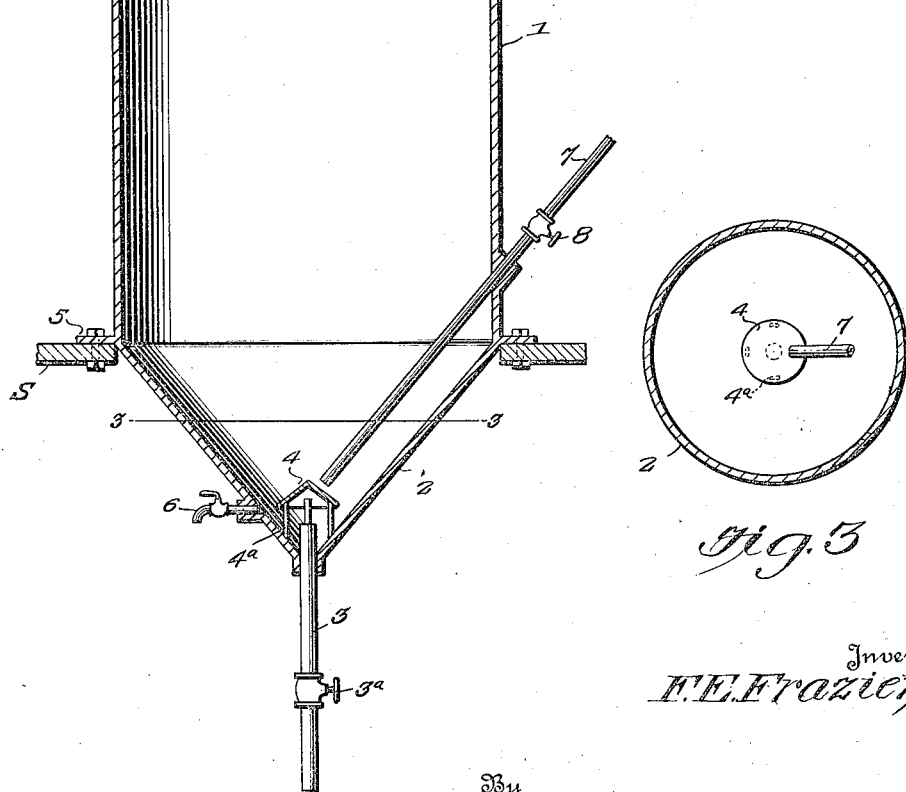
Inventor
F. E. Frazier,
By
Geo. P. Kimmel, Attorney Patented Sept. 9, 1924.

1,508,177

UNITED STATES PATENT OFFICE.

FLOYD E. FRAZIER, OF IOWA CITY, IOWA.

APPARATUS FOR WASHING MILK OF MAGNESIA.

Application filed January 8, 1921. Serial No. 435,877.

*To all whom it may concern:*

Be it known that I, FLOYD E. FRAZIER, a citizen of the United States, residing at Iowa City, in the county of Johnson and State of Iowa, have invented certain new and useful Improvements in an Apparatus for Washing Milk of Magnesia, of which the following is a specification.

This invention relates to an apparatus for washing milk of magnesia.

With this and other objects in view, the invention consists in certain novel features of construction as hereinafter shown and described, and specifically pointed out in the claims.

In the accompanying drawings.

Figure 1 represents a vertical central section of the apparatus constituting this invention.

Fig. 2 is a transverse section taken on the line 2—2 of Fig. 1, and

Fig. 3 is a similar view taken on the line 3—3 of Fig. 1.

Milk of magnesia as is well known, is $Mg(OH)_2$+aqua. Ordinarily the ingredients which constitute the milk of magnesia are stirred or mixed together in a large container several times larger than the amount to be made, sufficient distilled water being added to fill the container, which is left to stand from thirty-six to forty-eight hours. All of the water is then drained off and more added day by day until the mixture is freed from the sodium or magnesium sulfates which are formed from the reaction of the ingredients used in the preparation of milk of magnesia. This method requires from two to three months to obtain the milk of magnesia used in commerce. The apparatus constituting this invention has been designed to reduce the time for washing such milk and consists in placing the milk of magnesia in a container such as that shown at 1 in the accompanying drawings and then admitting air under pressure into the bottom of the container for mixing and agitating the milk of magnesia. Water is then forced through the bottom of the container to free the sulfates which are carried off by the water, but the water before leaving the container is filtered to retain the milk of magnesia mixture which is freed from the soluble sulfates and other undesirable materials.

The apparatus employed for carrying out this process comprises the container 1 which is preferably in the form of a cylinder having a hopper-like bottom 2 with a water inlet pipe 3 opening through the apex thereof. This pipe 3 is provided with a control valve $3^a$ shown clearly in Fig. 1. The end of the pipe which is disposed in the lower end of the hopper-like bottom 2 of the container has arranged thereover a combined cone-shaped spreader and deflector 4 which is mounted on suitable pins $4^a$.

At the junction of the bottom 2 with the body of the container is an annular flange 5 apertured for attaching the container to a suitable support shown at S.

A drain cock or faucet 6 opens through one side wall of the bottom 2 near its lower end for drawing off the contents of the container.

An air supply pipe 7 extends obliquely through one side wall of the container 1 into the bottom 2 and terminates at its inner end at a point adjacent the water spreader 4 against which the air admtted therethrough impinges and is broken up and passes through the ingredients in the container effecting a thorough mixing thereof. This pipe 7 is provided outside of the container 1 with a control valve 8 for admitting and cutting off the air under pressure which is designed to be supplied through the pipe.

The upper end of the body of the container 1 is provided with an outstanding laterally projecting flange 9 and a top 10 for the container has a similar flange 11 at its lower end between which and flange 9 are clampingly secured a filtering disk 12 and a foraminous disk 13, as is shown clearly in Fig. 1, clamps 14 being shown for securing them together, adjusting screws $14^a$ being shown for securing the clamps in operative position.

A water outlet pipe 15 opens through one side wall of the top 10, and is designed for conducting off the filtered water to a suitable place of deposit.

In the use of the apparatus, the ingredients forming the milk of magnesia are placed in the container and subjected to compressed air supplied through pipe 7 within the container at the bottom thereof. After the ingredients have been subjected to compressed air, water under pressure is supplied by the pipe 3 which enters the container at the bottom thereof, and the water rises through and washes the mixture, then passes through the filtering disk 12 and foraminous disk 13 and is discharged through the medium of the pipe 15 at the top of the container.

The process carried out by the apparatus above described accomplishes as much in one day of eight hours under equal conditions as the old process will in sixty days. It will thus be seen the time consumed for carrying out the process is greatly reduced.

The preferred embodiment of the invention is disclosed in the drawings and set forth in the specifications, but it will be understood that any modifications within the scope of the claimed invention may be made in the construction without departing from the principle of the invention or sacrificing any of its advantages.

I claim:

1. An apparatus for washing milk of magnesia, comprising a cylindrical container having an inverted cone-shaped bottom, a water inlet pipe extending through the apex of and opening into said bottom in proximity to the apex, a spreader supported by the bottom and arranged over and in proximity to the inner end of said pipe, and a compressed air pipe discharging on the upper face of the spreader.

2. An apparatus for washing milk of magnesia, comprising a cylindrical container having an inverted cone-shaped bottom, a water inlet pipe extending through the apex of and opening into said bottom in proximity to the apex, a spreader supported by the bottom and arranged over and in proximity to the inner end of said pipe, and a compressed air pipe discharging on the upper face of the spreader, an outlet at the upper end of the container and a filtering element positioned intermediate the ends of the container.

3. An apparatus for washing milk of magnesia, comprising a container having an inverted cone-shaped bottom, a water inlet pipe extending through the apex of and opening into said bottom in proximity to the apex of the latter, a cone-shaped spreader supported by the bottom and arranged over and in proximity to the inner end of said pipe, and a compressed air pipe discharging on the upper face of the spreader.

4. An apparatus for washing milk of magnesia, comprising a container having an inverted cone-shaped bottom, a water inlet pipe extending through the apex of and opening into said bottom in proximity to the apex of the latter, a cone-shaped spreader supported by the bottom and arranged over and in proximity to the inner end of said pipe, a compressed air pipe discharging on the upper face of the spreader, means to provide an outlet at the upper end of the container, a filtering element secured to the container intermediate the ends thereof, and a drain cock communicating with the bottom of the container in proximity to said spreader.

5. An apparatus for washing milk of magnesia, comprising a container formed of a cylindrical body portion closed at its top and having an inverted cone-shaped bottom, a water inlet pipe extending into the apex of and opening into said bottom in proximity to the apex thereof, a cone-shaped spreader supported by the bottom and arranged over and in proximity to the inner end of said pipe, and an inclined compressed air supply pipe supported by said cylindrical body portion and extending to a point in close proximity of and discharging on to the upper face of said spreader.

6. An apparatus for washing milk of magnesia, comprising a container formed of a cylindrical body portion closed at its top and having an inverted cone-shaped bottom, a water inlet pipe extending into the apex of and opening into said bottom in proximity to the apex thereof, a cone-shaped spreader supported by the bottom and arranged over and in proximity to the inner end of said pipe, an inclined compressed air supply pipe supported by said cylindrical body portion and extending to a point in close proximity of and discharging on to the upper face of said spreader, said body portion provided with an outlet in proximity to the top thereof, and a filtering element secured to said body portion intermediate the ends thereof.

7. An apparatus for washing milk of magnesia, comprising a container consisting of a cylindrical body portion closed at its top and having an inverted cone-shaped bottom, a water inlet pipe extending through the apex of and opening into said bottom in proximity to the apex thereof, a spreader supported by the bottom and arranged over and in proximity to the inner end of said pipe, and a valved compressed air supply pipe supported from said body portion and disposed at an inclination and further extending in close proximity to and discharging against the upper face of the spreader.

8. An apparatus for washing milk of magnesia, comprising a container consisting of a cylindrical body portion closed at its top and having an inverted cone-shaped bottom, a water inlet pipe extending through the apex of and opening into said bottom in proximity to the apex thereof, a spreader supported by the bottom and arranged over and in proximity to the inner end of said pipe, a valved compressed air supply pipe supported from said body portion and disposed at an inclination and further extending in close proximity to and discharging against the upper face of the spreader, means to provide said body portion with an outlet in proximity to its closed top, a drain cock secured to said bottom in proximity to said spreader, and a filtering element secured to said body portion intermediate its ends.

9. An apparatus for washing milk of magnesia, comprising a container having an inverted cone-shaped body, a water pipe extending through the apex of and opening into said bottom in proximity to the apex thereof, a cone-shaped spreader supported by the bottom and arranged over and in proximity to the inner end of said pipe, and a compressed air supply pipe supported by the container above the bottom thereof and disposed at an inclination and extending to a point in close proximity to and discharging on to the upper face of the spreader.

In testimony whereof, I affix my signature hereto.

FLOYD E. FRAZIER.